United States Patent
Goami (10) Patent No.: US 7,969,829 B2
(45) Date of Patent: Jun. 28, 2011

(54) OBJECTIVE LENS DRIVING APPARATUS, OPTICAL PICKUP, AND INFORMATION RECORDING/REPRODUCING APPARATUS

(75) Inventor: Kazutaka Goami, Saitama (JP)

(73) Assignee: Pioneer Corporation, Tokyo (JP)

( * ) Notice: Subject to any disclaimer, the term of this patent is extended or adjusted under 35 U.S.C. 154(b) by 353 days.

(21) Appl. No.: 12/293,887

(22) PCT Filed: Mar. 14, 2007

(86) PCT No.: PCT/JP2007/055060
§ 371 (c)(1),
(2), (4) Date: Sep. 29, 2008

(87) PCT Pub. No.: WO2007/122913
PCT Pub. Date: Nov. 1, 2007

(65) Prior Publication Data
US 2009/0262631 A1    Oct. 22, 2009

(30) Foreign Application Priority Data
Mar. 24, 2006   (JP) ................................. 2006-083382

(51) Int. Cl.
*G11B 7/00* (2006.01)
(52) U.S. Cl. .................. 369/44.15; 369/44.14
(58) Field of Classification Search .......... None
See application file for complete search history.

(56) References Cited

U.S. PATENT DOCUMENTS

| 5,319,624 A * | 6/1994 | Yamasaki et al. .......... 369/44.14 |
| 2005/0002287 A1 * | 1/2005 | Tanaka .................. 369/44.15 |
| 2005/0105408 A1 * | 5/2005 | Kim et al. ................ 369/44.15 |

FOREIGN PATENT DOCUMENTS

| JP | 5-205303 | 8/1993 |
| JP | 7-182670 | 7/1995 |
| JP | 11-86307 | 3/1999 |
| JP | 2000-20987 | 1/2000 |
| JP | 2001-126280 | 5/2001 |
| JP | 2003-123285 | 4/2003 |

OTHER PUBLICATIONS

International Search Report for PCT/JP2007/055060, mailed May 22, 2007.

* cited by examiner

*Primary Examiner* — Joseph Haley
(74) *Attorney, Agent, or Firm* — Nixon & Vanderhye P.C.

(57) ABSTRACT

An objective lens driving device is provided with an objective lens; a lens holder for holding the objective lens; a pair of linear suspension springs for supporting the lens holder at each one end; a spring holder whereupon the other ends springs are fixed; and a driving means for at least driving the objective lens in a tracking direction together with the lens holder. The linear suspension springs have narrowed or widened end compared with the other end in plan view from an optical axis direction. The lens holder is supported to be driven in the tracking direction, by having the cross point of the two lines, which pass the suspension spring ends on one side and are vertical to the extending directions of the linear suspension springs, respectively, at the driving center.

12 Claims, 6 Drawing Sheets

OBJECTIVE LENS DRIVING APPARATUS, OPTICAL PICKUP, AND INFORMATION RECORDING/REPRODUCING APPARATUS

This application is the U.S. national phase of International Application No. PCT/JP2007/055060, filed 14 Mar. 2007, which designated the U.S. and claims priority to JP Application No. 2006-083382, filed 24 Mar. 2006, the entire contents of each of which are hereby incorporated by reference.

TECHNICAL FIELD

The present invention relates to an objective lens driving apparatus, an optical pickup, and an information recording/reproducing apparatus capable of eliminating or reducing a resonance possibly generated when recording or reproduction is performed on an optical disc, such as a CD (Compact Disc), DVD, BD (Blu-ray Disc), or HD (High Definition)-DVD.

BACKGROUND ART

This type of objective lens driving apparatus (i.e. actuator) is provided with a focus driving mechanism for driving an objective lens in a focusing direction of an optical disc, in order to focus a light spot on a track of the optical disc. In addition, in order to make the light spot follow the track of the optical disc, it is provided with a tracking driving mechanism for driving the objective lens in a tracking direction of the optical disc. At this time, along with the focus displacement or tracking displacement, the objective lens possibly gets an inclination. Moreover, synchronizing a rolling frequency with a rotation frequency of the optical disc (e.g. 160 kHz) or the like may cause a "pitching resonance" in the focusing direction or "yawing resonance" in the tracking direction. Such an inclination or resonance possibly reduces the reproduction quality or recording quality of the optical disc.

In order to handle such a failure, there has been suggested a technology of supporting a movable portion and a fixed portion, which constitutes the objective lens driving apparatus, with two pairs of suspension springs, each pair having two suspension springs, for opening the movable portion and the fixed portion in a "/\"(or inversed V) letter shape, i.e. for making them in so-called a "/\"(or inversed V) letter shaped structure (e.g. refer to a patent document 1). If such a "/\"(or inversed V) letter shaped structure is adopted, rotational stiffness improves, and the inclination of the objective lens reduces. In addition, by providing symmetric driving circuits on the both edges and providing the objective lens in substantially the center of a lens holder device, the response frequency characteristic of the objective lens driving apparatus is also improved, and the resonance can be controlled.

Alternatively, if the "/\"(or inversed V) letter shaped structure is not adopted, for example, in the objective lens driving apparatus in a Slim system in which the suspension springs are disposed in parallel, there has been suggested a technology of using a leakage magnetic flux to cancel a rotational moment around the rotation center of a high-order resonance mode, to thereby control the resonance (e.g. refer to a patent document 2).

Patent document 1: Japanese Patent Application Laid Open No. 2001-126280

Patent document 2: Japanese Patent Application Laid Open NO. Hei 11-86307

DISCLOSURE OF INVENTION

Subject to be Solved by the Invention

However, the objective lens driving apparatuses disclosed in the patent documents 1 and 2 possibly have the following technical problem. That is, in the focusing drive or tracking drive, a force acting on each of the suspension springs opened in the /\"(or inversed V) letter shape acts as a stretching force yet can act as a resonance source of the pitching resonance or yawing resonance. Moreover, the both resonances have a tradeoff relationship, and in order to eliminate one of the resonances, the other resonance is possibly sacrificed. In addition, according to the technology associated with the parallel structure disclosed in the patent document 2, in order to cancel the rotational moment, a force in an opposite direction to a thrust direction is intentionally generated, so that there is such a technical problem that a thrust force is reduced.

In view of the aforementioned problems, it is therefore an object of the present invention to provide an objective lens driving apparatus, an optical pickup, and an information recording/reproducing apparatus capable of preferably reducing or eliminating the resonance by a relatively simple structure.

Means for Solving the Subject (Objective Lens Driving Apparatus)

The above object of the present invention can be achieved by an objective lens driving apparatus provided with: an objective lens for focusing a laser beam on a disc-shaped recording medium; a lens holder, which holds the objective lens and which is driven at least in a tracking direction of the disc-shaped recording medium; a pair of linear suspension springs for supporting the lens holder on one ends so as to sandwich the lens holder from both sides thereof, viewed in a planar manner from an optical axis direction of the objective lens; a spring holder to which each of the other ends of the pair of linear suspension springs is fixed; and a driving device for at least tracking-driving the objective lens and the lens holder, the pair of linear suspension springs having a narrower or wider distance between the one ends than that between the other ends, viewed in the planar manner from the optical axis direction, the lens holder being supported by the pair of linear suspension springs and being driven by the driving device so as to be tracking-driven in a predetermined direction with respect to the disc-shaped recording medium, with an intersection of two linear segments as a driving center, each linear segment passing respective one of the one ends, each linear segment being perpendicular to an extending direction of respective one of the linear suspension springs, viewed in the planar direction from the optical axis direction.

According to the present invention, while operating an optical pickup provided with the objective lens driving apparatus or an optical information apparatus including this, if the laser beam is irradiated from a laser beam source, this laser beam is focused by the objective lens on the disc-shaped recording medium, such as a CD, DVD, or BD. The objective lens is held by the lens holder, and the lens holder is driven at least in the tracking direction of the disc-shaped recording medium. Here, it is the drift of the phrase "at least" that the lens holder may be driven in another direction, such as a focusing direction. The lens holder is supported by the pair of linear suspension springs having a suspension wire or the like on the one ends so as to sandwich the lens holder from the both sides thereof, viewed in the planar manner from the optical axis direction of the objective lens. Each of the other ends of the pair of linear suspension springs is fixed by the spring holder. Then, the objective lens and the lens holder are at least tracking-driven by the driving device having magnets or the like.

Here, the pair of linear suspension springs has a narrower or wider distance between the one ends than that between the other ends, viewed in the planar manner from the optical axis direction. Typically, the pair is in a "∕\"(or inversed V) letter shape, viewed in the planar manner from the optical axis direction. In addition, the lens holder is supported by the pair of linear suspension springs and is driven by the driving device so as to be tracking-driven in the predetermined direction with respect to the disc-shaped recording medium, with the intersection of two linear segments as the driving center, each linear segment passing respective one of the one ends, each linear segment being perpendicular (crossing at right angles) to an extending direction of respective one of the linear suspension springs, viewed in the planar direction from the optical axis direction. Incidentally, "perpendicular" indicates an angle of 90 degrees formed by each other in a narrow sense. In a broad sense, there may be a slight margin, and an angle formed by each other may be 90 degrees±5 degrees, for example, as long as the effect of the present invention can be seen to a greater or lesser extent.

Here, in accordance with the normal designing theory, it is assumed that the driving center is not the intersection but a midpoint of a linear segment connecting the one ends of the pair of linear suspension springs. Then, the line segment and each of the pair of linear suspension springs do not cross at right angles. Thus, if a driving force in the tracking direction is applied to the driving center, components are left along the pair of linear suspension springs. The left components act as stretching forces, which possibly generate a resonance (so-called yawing resonance) in the pair of linear suspension springs. In particular, if the suspension springs are oscillated at peculiar resonance frequencies in the stretching directions of the suspension springs, the resonance can be generated significantly.

According to the present invention, however, the linear segment connecting the one ends of the pair of linear suspension springs and each of the pair of linear suspension springs cross at right angles. Thus, even if the driving force in the tracking direction is applied to the driving center, there are only left components, each crossing respective one of the pair of linear suspension springs at right angles, or there are no or little components that work as the stretching forces, compared to the components crossing the linear suspension springs at right angles. Thus there is no or little possibility that each of the pair of linear suspension springs resonates significantly. Incidentally, not only the literal "intersection" but also a point closer to the intersection side than the midpoint of the linear segment according to the designing theory may be set as the driving center, as long as the effect of reducing the resonance described above can be achieved to a greater or lesser extent.

As described above, according to the present invention, since the driving center is preferably adjusted, for example, even if the driving force in the tracking direction is applied, the resonance is not generated or hardly generated. That is, compared to the objective lens driving apparatus designed in accordance with the designing theory, the resonance is reduced or eliminated. Therefore, the quality of servo control and the quality of reading/writing of a signal with respect to a disc-shaped recording medium are also improved, so that it is extremely useful in practice. In addition, there is no need to apply some prohibitive power to control the resonance, so that the loss of the driving force is also reduced or eliminated, and it is possible to drive the objective lens, extremely efficiently.

In one aspect of the objective lens driving apparatus of the present invention, the lens holder holds at least two objective lenses.

According to this aspect, the lens holder holds at least two objective lenses, in which different focus distances are required and which use the laser beams that have different wavelengths, in order to respond to a plurality of types of disc-shaped recording media, such as a CD and BD. If there are a plurality of objective lenses, the structure of the lens holder becomes complicated, and in particular, the distance between the driving center and the lens center becomes large. Thus, there is a possibility that an adverse effect of the resonance increases, significantly. Even in such a case, it is effective to adjust the position of the driving center as described above. Incidentally, the present invention does not particularly restrict the arrangement of the at least two objective lenses, in effect. They may be arranged in a radial direction, or in the tracking direction.

In an aspect in which the at least two objective lenses are held, the at least two objective lenses may be arranged on a linear segment which is sandwiched between the pair of linear suspension springs and which passes the driving center.

Such arrangement possibly further increases the adverse effect, with respect to at least the objective lens relatively far from the driving center. Even in such a case, it is effective to adjust the position of the driving center as described above. For example, even if the driving force in the tracking direction is applied, the resonance is not generated or hardly generated. Therefore, it is possible to preferably respond to the plurality of types of disc-shaped recording media.

In another aspect of the objective lens driving apparatus of the present invention, the pair of linear suspension springs includes a plurality of linear suspension springs arranged in the optical axis direction in each of the both sides.

According to this aspect, the present invention can be applied not only in the case where the linear suspension springs make a pair, but also in the case where the plurality of suspension springs are included. For example, with regard to pairs of linear suspension springs of the plurality of suspension springs, the intersection of the two linear segments, each passing respective one of the one ends and each being perpendicular to respective one of the extending directions, is obtained for each pair. Then, by disposing the driving center on the linear segment connecting the intersections, the resonance is reduced or eliminated on the basis of the similar effect as that of the objective lens driving apparatus described above. Incidentally, if there are three pair or more of suspension springs, main two pairs are determined on the basis of the functional viewpoint of the suspension from them. By this, it is effective to a greater or lesser extent even if the driving center is disposed as described above with respect to the main two pair.

In another aspect of the objective lens driving apparatus of the present invention, the driving device focusing-drives the objective lens in addition to tracking-driving it.

According to this aspect, the objective lens is not only tracking-driven but also focusing-driven by the driving device.

In an aspect of the focusing-drive, the driving center may be also a driving center in focusing-driving the objective lens.

According to this aspect, the driving center may be the driving center in focusing-driving the objective lens. That is, the driving center is the common driving center in the tracking drive and the focusing drive.

Then, in an aspect of the focusing-drive, the lens holder may be supported by the pair of linear suspension springs and may be driven by the driving device so as to relatively reduce a pitching resonance and a yawing resonance, the pitching resonance being possibly generated in driving in the tracking direction, the yawing resonance being possibly generated in driving in the focusing direction.

According to this aspect, it is effective in the case where the tracking drive and the focusing drive are both performed, as seen often in practice. That is, even if it is relatively hard to reduce the resonances related to the both driving, the lens holder is supported by the pair of linear suspension springs and is driven by the driving device so as to relatively reduce the pitching resonance and the yawing resonance. Thus, the both resonances are reduced or eliminated.

In another aspect of the objective lens driving apparatus of the present invention, the driving device has: a tracking drive coil for driving the lens holder in the tracking direction; a focusing drive coil for driving the lens holder in the focusing direction; and magnets arranged with their different magnetic poles facing to each other.

According to this aspect, the driving force in the tracking direction or in the focusing direction is applied by electromagnetic or mechanical forces acting among the tracking drive coil, the focusing driving coil, and the magnet provided for the driving device, and the objective lens is driven. Even in such a case, the driving center is preferably adjusted and driven, so that the resonance in driving is preferably reduced or eliminated.

In an aspect in which the tracking drive coil, the focusing driving coil, and the magnets are provided, at least one of arrangement of each of the magnets, a ratio of areas of facing surfaces and a ratio of mass may be adjusted such that the driving center approaches the intersection.

According to this aspect, for example, the mass of the magnet on the closer side to the position of the desired driving center of the facing magnets is increased. By adjusting various features related to the magnets, the driving center is bought closer to the intersection and preferably matched with it, by which the resonance is reduced or eliminated.

Alternatively, in an aspect in which the tracking drive coil, the focusing driving coil, and the magnets are provided, at least one of a ratio of electricity and a ratio of the number of winding between the tracking drive coil and the focusing drive coil may be adjusted.

According to this aspect, for example, the ratio of the number of winding is adjusted such that the magnetic force of the magnet on the closer side to the position of the desired driving center of the facing magnets is stronger than that of the magnet on the other side. By adjusting various features related to the both magnets, the driving center is bought closer to the intersection and preferably matched with it, by which the resonance is reduced or eliminated.

(Optical Pickup)

The above object of the present invention can be also achieved by an optical pickup provided with: the objective lens driving apparatus of the present invention (including its various aspects); a laser beam source for irradiating the laser beam; and an optical system for guiding the laser beam to the objective lens driving apparatus.

According to the optical pickup of the present invention, it is provided with the objective lens driving apparatus described above. Thus, as in the objective lens driving apparatus of the present invention described above, the resonance is reduced or eliminated.

Incidentally, even the optical pickup of the present invention can adopt the same various aspects as those of the objective lens driving apparatus of the present invention described above.

(Information Recording/Reproducing Apparatus)

The above object of the present invention can be also achieved by an information recording/reproducing apparatus provided with: the optical pickup of the present invention (including its various aspects); a signal recording/reproducing device for providing a signal related to recording or receiving a signal related to reproduction, with respect to the optical pickup, in order to perform the recording or the reproduction of the signal with respect to the disc-shaped recording medium; and a rotating device for rotating the disc-shaped recording medium along with the recording or the reproduction.

According to the information recording/reproducing apparatus of the present invention, it is provided with the optical pickup provided with the objective lens driving apparatus described above. Thus, as in the objective lens driving apparatus of the present invention described above, the resonance is reduced or eliminated.

Incidentally, even the information recording/reproducing apparatus of the present invention can adopt the same various aspects as those of the objective lens driving apparatus of the present invention described above.

As explained above, according to the objective lens driving apparatus of the present invention, it is provided with the objective lens, the lens holder, the linear suspension springs, the spring holder, and the driving device. According to the optical pickup of the present invention, it is provided with the objective lens driving apparatus described above, the laser beam source, and the optical system. Moreover, according to the information recording/reproducing apparatus of the present invention, it is provided with the optical pickup described above, the signal recording/reproducing device, and the rotating device. Thus, the resonance possibly generated when the objective lens is driven in the tracking direction is reduced or eliminated by the relatively simple structure.

These effects and other advantages of the present invention will become more apparent from the embodiments explained below.

DESCRIPTION OF REFERENCE CODES 1 information recording/reproducing apparatus
100 optical disc
10 optical pickup
11 objective lens driving apparatus
3 spindle motor
4 signal recording/reproducing device
2 CPU (drive control device)
5 memory
6 data input/output control device
7 operation control device
16, 162 objective lens
12 lens holder
13 spring holder
171 suspension spring (right)
172 suspension spring (left)
121, 122, 131, 132 spring connection
20 suspension center
1712 suspension spring (right)
1722 suspension spring (left)
1212, 1222, 1312, 1322 spring connection
181, 182 magnet
183 magnet (small)
185 base
190 focusing coil
191 tracking coil
21 focusing drive center and center of gravity of lens holder Ass'y
22 tracking drive center

BEST MODE FOR CARRYING OUT THE INVENTION

Hereinafter, the best mode for carrying out the present invention will be explained in each embodiment in order with reference to the drawings.

(1) First Embodiment

Figure 1:
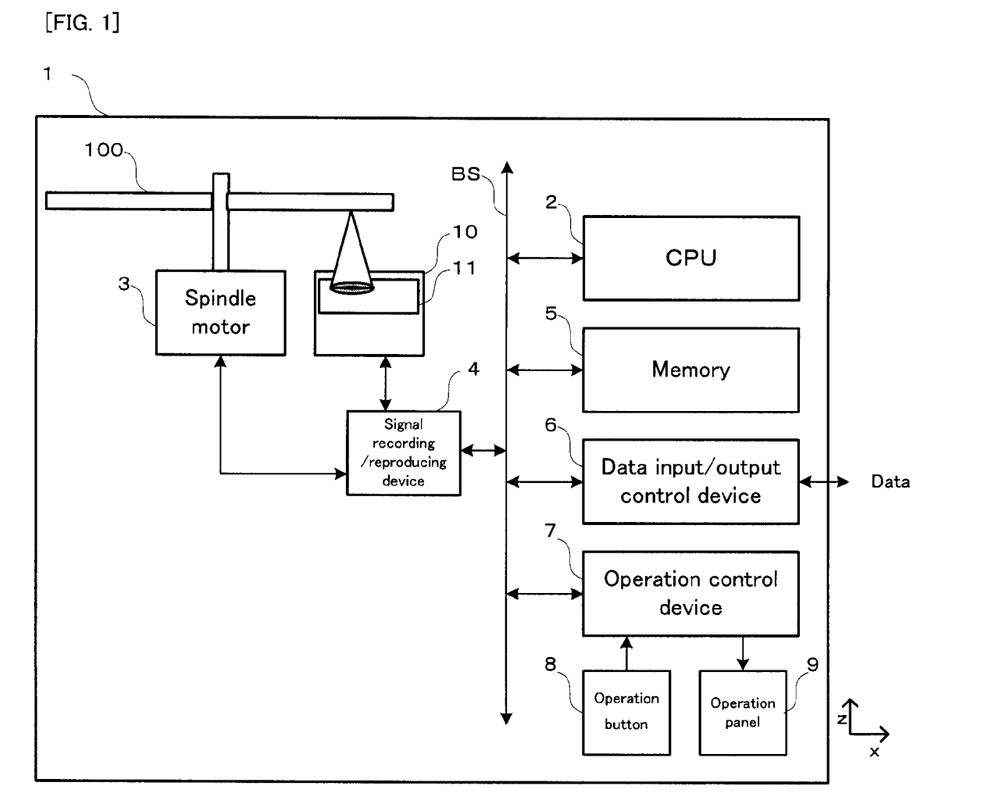
FIG. 1 is a block diagram conceptually showing the basic structure of an information recording/reproducing apparatus provided with an objective lens driving apparatus in a first embodiment of the present invention.

With reference to FIG. 1 to FIG. 4, an explanation will be given on the structure and operation process of an objective lens driving apparatus in a first embodiment. FIG. 1 is a block diagram conceptually showing the basic structure of the information recording/reproducing apparatus provided with the objective lens driving apparatus in the first embodiment of the present invention.

In FIG. 1, an information recording/reproducing apparatus 1, which is one example of the "information recording/reproducing apparatus" of the present invention, is provided with: an optical pickup 10; an objective lens driving apparatus 11; a spindle motor 3; a signal recording/reproducing device 4; a CPU 2; a memory 5; a data input/output control device 6; an operation control device 7; and the like. Under the control of the CPU 2, the information recording/reproducing apparatus 1 records information onto an optical disc 100 and reads the information recorded on the optical disc 100.

The optical disc 100 is a recording medium on which information recording and reproduction can be performed by irradiating its recording surface with a laser beam, such as a CD, DVD, and a BD.

The optical pickup 10 is one example of the "optical pickup" of the present invention, and has a semiconductor laser, an optical system, an objective lens, a light receiving element, the objective lens driving apparatus 11, and the like. The laser beam emitted from the semiconductor laser and guided by the optical system is focused on the recording surface of the optical disc 100 by the objective lens included in the objective lens driving apparatus 11. The laser beam reflected by the recording surface is received by the light receiving element. In this manner, the information recording or reproduction is performed on the optical disc 100.

The objective lens driving apparatus 11 is one example of the "objective lens driving apparatus" of the present invention. The objective lens driving apparatus 11 includes an objective lens 16 and is an apparatus for driving the objective lens 16 in the tracking direction or focusing direction of the optical disc 100. The details will be described later using FIG. 2.

The spindle motor 3 rotates and stops the optical disc 100 and operates in accessing the optical disc 100. More specifically, the spindle motor 3 is adapted to rotate and stop the optical disc 100 at a predetermined speed under spindle servo by a not-illustrated servo unit or the like.

The signal recording/reproducing device 4 controls the optical pickup 10 and the spindle motor 3, to thereby perform the recording/reproduction on the optical disc 100.

The CPU 2 is connected to the signal recording/reproducing device 4 and the memory 5 through a bus BS and gives an instruction to each control device, to thereby control the entire information recording/reproducing apparatus 1. Normally, software for operating the CPU 2 is stored in the memory 5.

The memory 5 is used in the general data processing on the information recording/reproducing apparatus 1, including a buffer area for the data, an area used as an intermediate buffer when data is converted into the data that can be used on the signal recording/reproducing device 4, and the like. Moreover, the memory 5 is provided with: a ROM area into which a program for performing an operation as a recording device is stored; a buffer for compression/decompression of the video data; a RAM area into which a parameter required for the operation of a program operation is stored; and the like.

The data input/output control device 6 controls the input/output of the data from the exterior with respect to the information recording/reproducing apparatus 1, to thereby perform storage to and export from the data buffer on the memory 315. For example, if the data input/output is a video signal, the data received from the exterior is compressed (or encoded) into MPEG format and outputted to the memory 5 at the data input, and the data in the MPEG format received from the memory 5 is decompressed (or decoded) and outputted to the exterior at the data output.

The operation control device 7 receives an operation instruction and performs display with respect to the information recording/reproducing apparatus 1, and transmits an instruction by an operation button 8, such as an instruction to record or reproduce, to the CPU 2. The operational state of the information recording/reproducing apparatus 1, such as during recording and during reproduction, is outputted to a display panel 9, such as a fluorescent tube.

Figure 2:
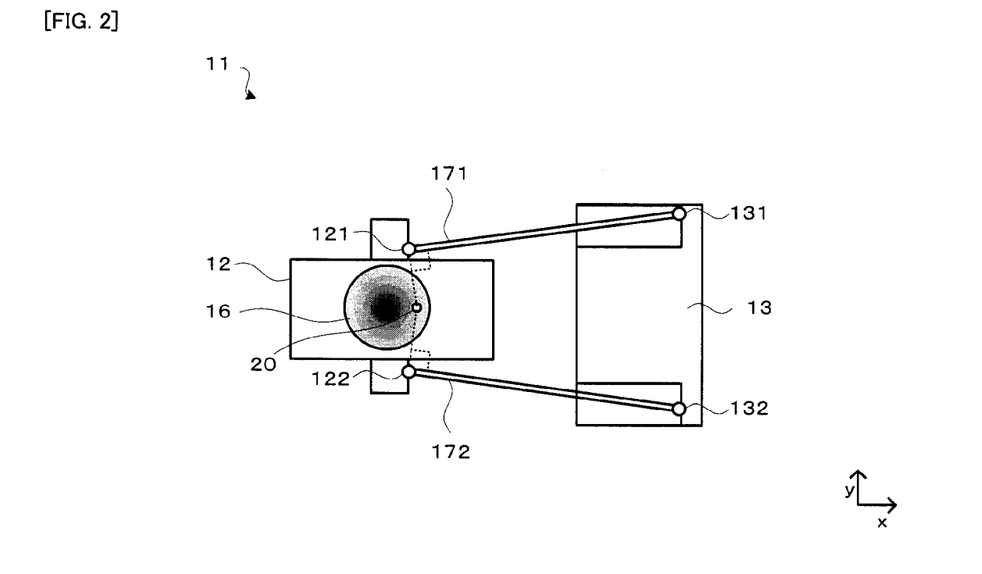
FIG. 2 is a plan view conceptually showing the basic structure of the objective lens driving apparatus in the first embodiment.

Now, with reference to FIG. 2, the structure of the objective lens driving apparatus 11 is explained in more details. FIG. 2 is a plan view conceptually showing the basic structure of the objective lens driving apparatus 11 in the first embodiment.

In FIG. 2, the objective lens driving apparatus 11 in the embodiment is provided with: an objective lens 16, which is one example of the "objective lens" of the present invention; a lens holder 12, which is one example of the "lens holder" of the present invention; a spring holder 13, which is one example of the "spring holder" of the present invention; a suspension spring (right) 171 and a suspension spring (left) 172, which are one example of the "one pair of linear suspension springs" of the present invention.

Here, the objective lens 16 is adapted to focus the laser beam entering through the optical system on the recording surface of the optical disc 100 and to return the light reflected by the recording surface to the optical system.

The lens holder 12 is adapted to hold the objective lens 16 and to be movable with respect to the objective lens driving apparatus 11 in the focusing direction or tracking direction, for example.

The spring holder 13 is fixed to the objective lens driving apparatus 11.

The suspension spring (right) 171 is adapted to support the lens holder 12 and the spring holder 13 by soldering or the like at a spring connection 121 and a spring connection 131.

The suspension spring (left) 172 is adapted to support the lens holder 12 and the spring holder 13 by soldering or the like at a spring connection 122 and a spring connection 133.

Incidentally, preferably, the suspension spring (right) 171 and the suspension spring (left) 172 may be disposed to make a "/\"(or inversed V) letter shape in planar view as shown in FIG. 2, in order to increase rotational stiffness. That is, they are disposed such that the interval between the spring connection 121 and the spring connection 122 is wider or narrower than the interval between the spring connection 131 and the spring connection 132.

In the embodiment, in particular, as shown in FIG. 2, as viewed in a planar manner from the optical axis direction of the objective lens 16 (i.e. a perpendicular direction to the paper of FIG. 2), a suspension center 20 is an intersection of a perpendicular line to the suspension spring (right) 171 drawn from the spring connection 121 and a perpendicular line to the suspension spring (left) 172 drawn from the spring connection 122. Moreover, it is constructed such that the suspension center 20 matches a driving center when the objective lens 16 is driven in the tracking direction, for example. Hence, it is possible to preferably reduce or eliminate not only the "pitching resonance" in the focusing direction but also the "yawing resonance" in the tracking direction.

Figure 3:
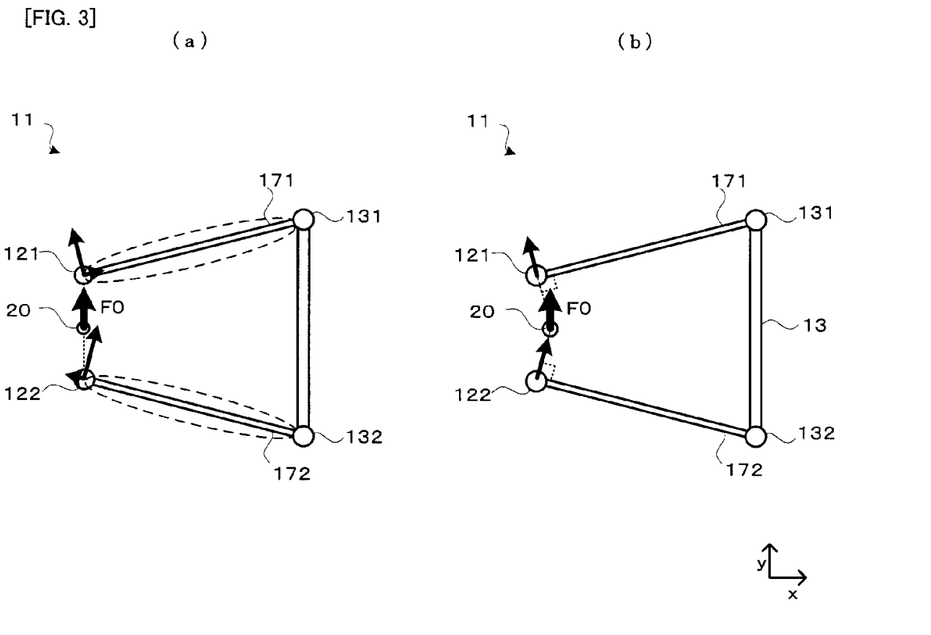
FIG. 3 are plan views showing a force acting on the objective lens driving apparatus as a link model in the first embodiment.
Figure 4:
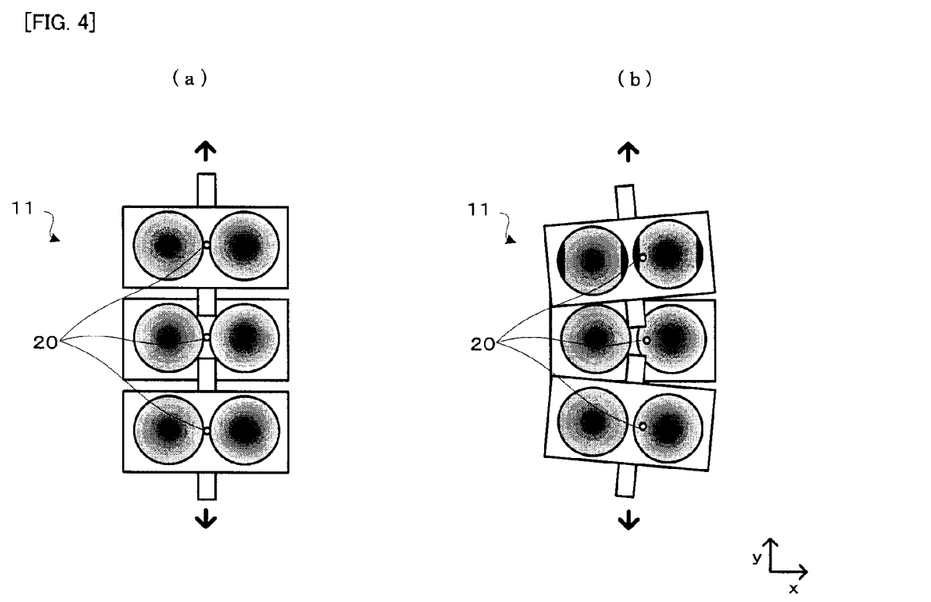
FIG. 4 are plan views showing a trajectory in which the objective lens driving apparatus is driven in the tracking direction in the first embodiment.

Next, the operation at this time will be explained, using FIG. 3 and FIG. 4. FIG. 3 are plan views showing a force acting on the objective lens driving apparatus as a link model in the first embodiment. FIG. 4 are plan views showing a trajectory in which the objective lens driving apparatus is driven in the tracking direction in the first embodiment.

Firstly, FIG. 3(a) shows the force acting on the objective lens driving apparatus in a comparison example, as the link model. FIG. 4(a) shows the trajectory in which the objective lens is driven in the tracking direction. According to those drawings, the objective lens driving apparatus 11 in the comparison example is designed in accordance with the normal designing theory, i.e. considering that the driving center in the focusing direction (i.e. a mechanically stabilized point of the thrust force in the focusing direction of a coil) matches the driving center in the tracking direction (i.e. a mechanically stabilized point of the thrust force in the tracking direction of the coil), so as to match the driving centers, the suspension center 20 (i.e. a mechanically stabilized point of the suspension springs), and the center of gravity of the lens holder assembly (i.e. the center of gravity of the entire lens holder 12 including the objective lens 16).

Here, when the objective lens driving apparatus 11 is driven in the tracking direction as shown in FIG. 4(a), a predetermined amount of force F0 acts in the tracking direction on the driving center in the tracking direction, i.e. on the same position as the suspension center 20 in FIG. 3(a). At this time, since the tracking direction and each of the suspension springs do not cross at right angles, if the force F0 is decomposed with respect to the spring connection device 121 and the spring connection device 122, components are left in the directions along the both suspension springs. The left components act as stretching forces with respect to the both suspension springs. If the objective lens driving apparatus 11 is operated at peculiar resonance frequencies in the stretching directions of the suspension springs, a significant resonance can be generated.

On the other hand, FIG. 3(b) shows the force acting on the objective lens driving apparatus in the embodiment, as the link model. FIG. 4(b) shows the trajectory in which the objective lens is driven in the tracking direction. According to those drawings, the objective lens driving apparatus 11 in the embodiment is designed particularly such that the intersection of the perpendicular line to the suspension spring (right) 171 drawn from the spring connection 121 and the perpendicular line to the suspension spring (left) 172 drawn from the spring connection 122 is defined as the suspension center 20 and such that the suspension center 20 matches at least the driving center in the tracking direction.

Here, in driving the objective lens driving apparatus 11 in the tracking direction as shown in FIG. 4(b), a predetermined amount of force F0 acts in the tracking direction on the driving center in the tracking direction, i.e. the suspension center 20 in FIG. 3(b). At this time, since the tracking direction and each of the both suspension springs cross at right angles, even if the force F0 is decomposed with respect to the spring connection 121 and the spring connection 122, components are not left in the directions along the both suspension springs. Therefore, in biasing in the tracking direction, although the lens holder assembly is biased with a slight rotation in accordance with a shift in position between the suspension center 20 and the center of gravity of the lens holder assembly, the stretching forces do not act on the both suspension springs. Hence, even if the objective lens driving apparatus 11 is operated at the resonance frequencies in the stretching directions of the both suspension springs, the resonance is not generated because there is no stretching force which can be the resonance source.

As explained above with respect to FIG. 1 to FIG. 4, according to the objective lens driving apparatus 11 in the embodiment, since it is designed such that the suspension center 20 is in proper position, the "pitching resonance" in the focusing direction and the "yawing resonance" in the tracking direction are preferably reduced or eliminated. Therefore, it is possible to further improve the reproduction or recording quality of the optical disc 100 using the information recording/reproducing apparatus 1.

(2) Second Embodiment

Figure 5:
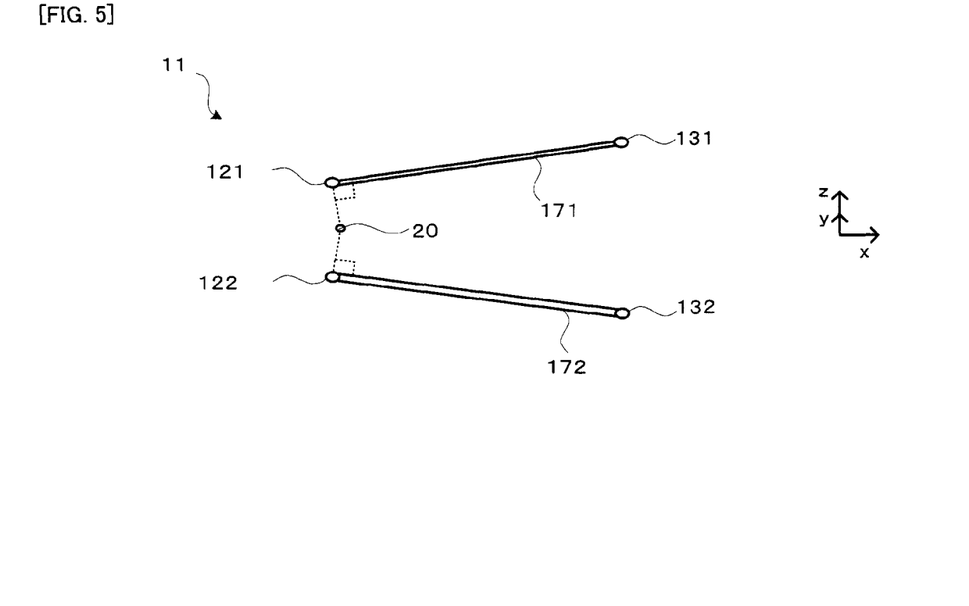
FIG. 5 is a perspective view showing the link model of the objective lens driving apparatus having two suspension springs in the first embodiment.
Figure 6:
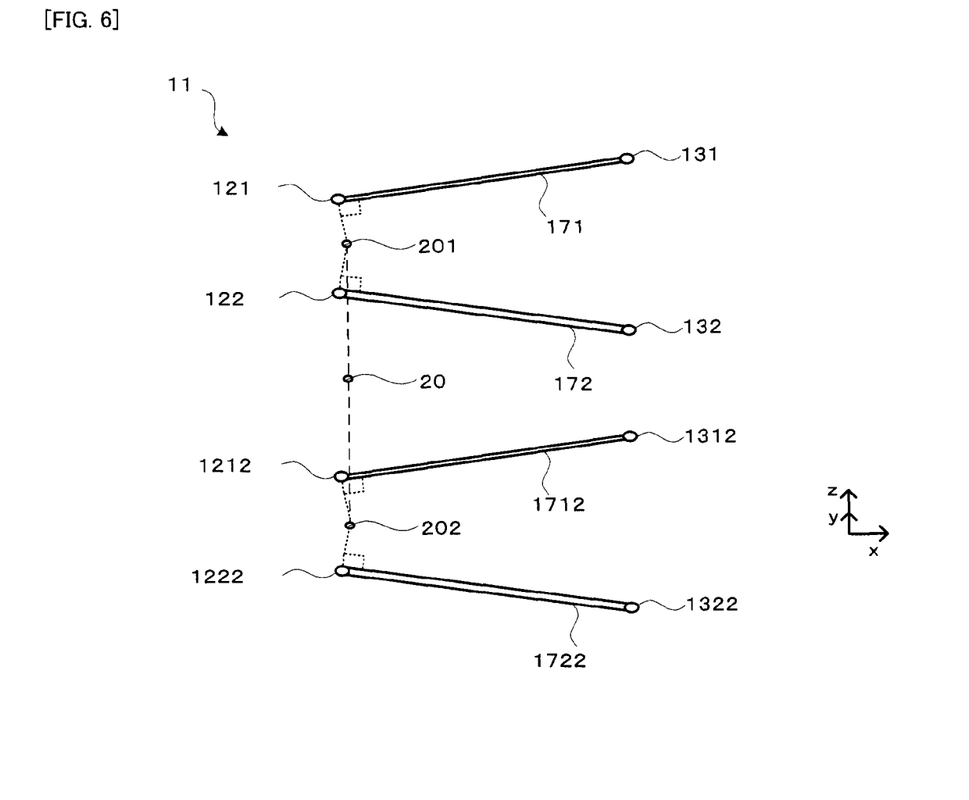
FIG. 6 is a perspective view showing the link model of an objective lens driving apparatus having four suspension springs in a second embodiment.

Next, with reference to FIG. 5 and FIG. 6 in addition to FIG. 1, an explanation will be given on the structure and operation process of an objective lens driving apparatus 11 in a second embodiment. Incidentally, in FIG. 5 and FIG. 6, the same structure as that in the aforementioned drawings carries the same numerical reference, and the explanation thereof will be omitted as occasion demands. FIG. 5 is a perspective view showing the link model of the objective lens driving apparatus having two suspension springs in the first embodiment. FIG. 6 is a perspective view showing the link model of an objective lens driving apparatus having four suspension springs in a second embodiment.

In the embodiment, in particular, what is different from the first embodiment is the position of the suspension center 20, coming from a difference in the number and arrangement of the suspension springs. Specifically, the suspension springs in the embodiment (refer to FIG. 6) are disposed such that two pairs of the suspension springs in the first embodiment (refer to FIG. 5) are piled in a z direction. That is, compared to the first embodiment, a suspension spring (right) 1712, a suspension spring (left) 1722, a spring connection 1212, a spring connection 1222, a spring connection 1312, and a spring connection 1322 are added. In the structure, the suspension center 20 may be defined as follows. That is, the intersection of the perpendicular line to the suspension spring (right) 171 drawn from the spring connection 121 and the perpendicular line to the suspension spring (left) 172 drawn from the spring connection 122 is set to an intersection 201, and in the same manner, an intersection of a perpendicular line to the suspension spring (right) 1712 drawn from the spring connection 1212 and a perpendicular line to the suspension spring (left) 1722 drawn from the spring connection 1222 is set to an intersection 202. Then, the suspension center 20 may be defined on a line segment connecting the two intersections, i.e. the intersection 201 and the intersection 202. The suspension center 20 is typically a midpoint of the line segment connecting the intersection 201 and the intersection 202. Then, it is constructed such that the driving center matches the suspension center 20. According to the structure, even if a force directed in the tracking direction (z direction) or focusing direction (y direction) acts on the suspension center 20, there are only components crossing at right angles with respect to every suspension springs. Thus, there are no stretching forces acting on the both suspension springs, and the resonance is not generated.

As explained with reference to FIG. 6, according to the objective lens driving apparatus 11 in the embodiment, even if the number and arrangement of the suspension springs, in accordance with that, it is designed such that the suspension center 20 is in proper position. Thus, at least the "yawing resonance" in the tracking direction is preferably reduced or eliminated.

Incidentally, for example, even if six suspension springs, eight suspension springs, or the like are added, the embodiment is effective if it can be considered that any two or four of them are main structure determining factors and that the rest plays an auxiliary role. That is, the suspension center 20 may be defined for the main two or four suspension springs.

(3) Third Embodiment

Figure 7:
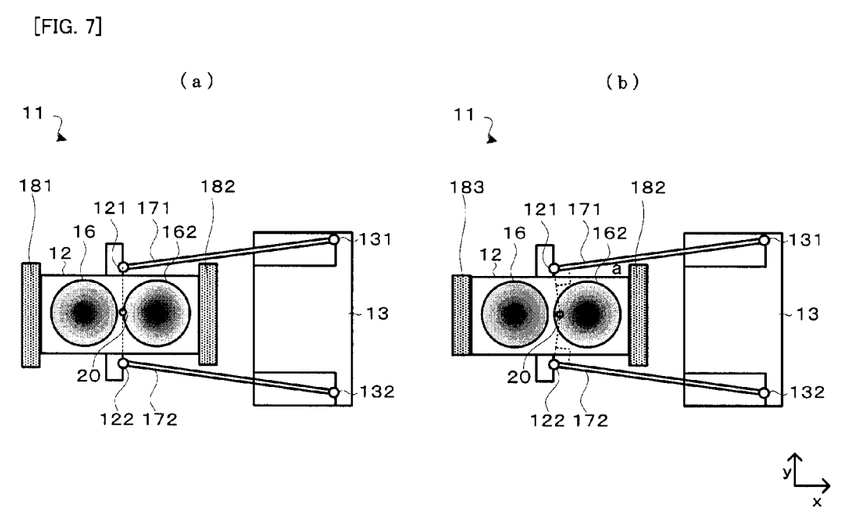
FIG. 7 are plan views conceptually showing the basic structure of an objective lens driving apparatus by a magnet method in a third embodiment.
Figure 8:
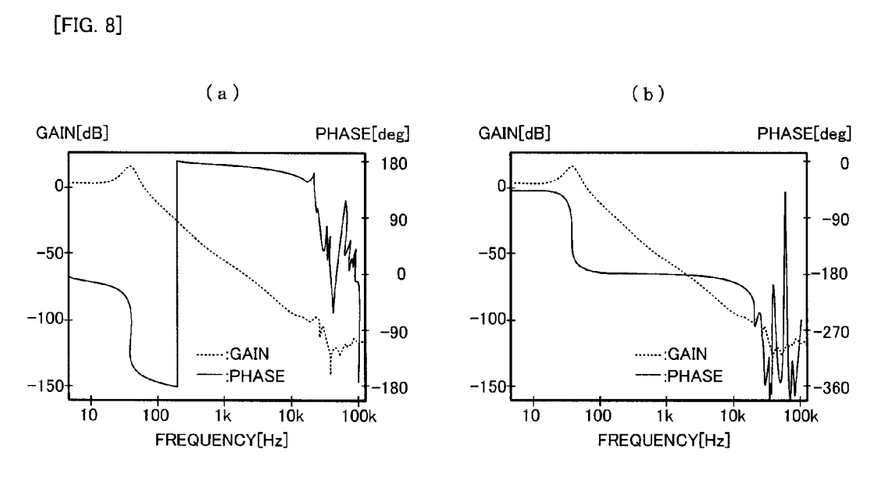
FIG. 8 are characteristic diagrams conceptually showing the basic structure of an objective lens driving apparatus by a magnet method in a third embodiment.
Figure 9:
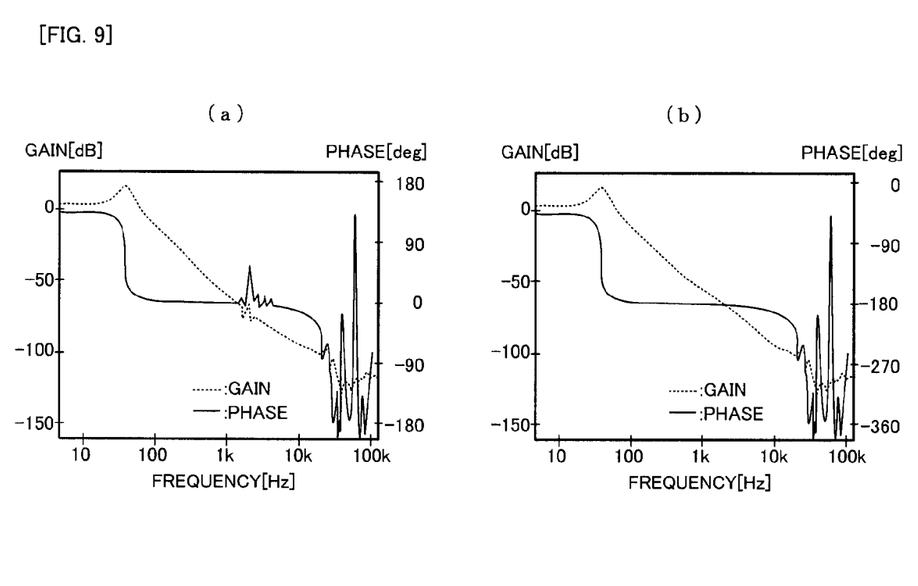
FIG. 9 are characteristic diagrams showing the frequency characteristic of the objective lens driving apparatus in the third embodiment.

Next, with reference to FIGS. 7 to FIGS. 9 in addition to FIG. 2, an explanation will be given on the structure and operation process of an objective lens driving apparatus 11 in a third embodiment. Incidentally, in FIGS. 7 to FIGS. 9, the same structure as that in the aforementioned drawings carries the same numerical reference and the explanation thereof will be omitted as occasion demands. FIG. 7 are plan views conceptually showing the basic structure of an objective lens driving apparatus by a magnet method in a third embodiment. FIG. 8 are characteristic diagrams conceptually showing the basic structure of an objective lens driving apparatus by a magnet method in a third embodiment. FIG. 9 are characteristic diagrams showing the frequency characteristic of the objective lens driving apparatus in the third embodiment. More specifically, FIG. 7(a) shows the basic structure of the objective lens driving apparatus 11 in a comparison example. FIG. 8(a) shows a phase delay [deg] and a gain [dB] of current sensitivity in the focusing direction in the structure. FIG. 9(a) shows a phase delay [deg] and a gain [dB] of current sensitivity in the tracking direction at that time. On the other hand, FIG. 7(b) shows the basic structure of the objective lens driving apparatus 11 in the embodiment example. FIG. 8(b) shows a phase delay [deg] and a gain [dB] of current sensitivity in the focusing direction in the structure. FIG. 9(b) shows a phase delay [deg] and a gain [dB] of current sensitivity in the tracking direction at that time.

In the embodiment, in particular, what is different from the aforementioned embodiments is that an objective lens 161 is further provided in addition to the objective lens 16, and that a magnet method is adopted in accordance with the provision as a specific structure for matching the driving center with the suspension center 20. Moreover, in FIG. 7, compared to the objective lens driving apparatus 11 by the magnet method in the comparison example (refer to FIG. 7(a)), the objective lens driving apparatus 11 by the magnet method in the embodiment (refer to FIG. 7(b)) mainly differs in the position of the suspension center 20 and the magnitude of magnetic forces by magnets for matching the driving center with the suspension center 20.

More specifically, in FIG. 7(a) in the comparison example, such a structure is adopted that a magnet 181 and a magnet 182 are disposed to face each other on the both sides of the lens holder 12, wherein the magnets have substantially equal areas of the facing surfaces. Here, the interval between the magnet 181 and the magnet 182 is set to have a pitching best position in which the pitching resonance is adjusted in order to eliminate the pitching resonance in FIG. 8(a). However, according to the structure, the yawing resonance is generated near 3 kHz in FIG. 9(a). On the contrary, if the yawing resonance is adjusted in order to eliminate the yawing resonance in FIG. 9(a), then the pitching resonance is generated in FIG. 8(a). That is, the structure in FIG. 7(a) provides a problem of tradeoff for the pitching resonance and the yawing resonance.

In contrast, in FIG. 7(b) in the embodiment, such a structure is adopted that instead of the magnet 181, a magnet 183 is disposed whose area facing the magnet 182 is smaller than that of the magnet 182. According to the structure, the adjustment can be performed such that each driving center, in other words, a moment balanced point is shifted to the spring holder 13 side by a difference in the magnetic force according to the difference in area and matches the suspension center 20. As a result, as shown in FIG. 8(b) and FIG. 9(b), it is possible to eliminate or reduce both the pitching resonance and the yawing resonance.

As explained above with reference to FIG. 7 to FIG. 9, according to the objective lens driving apparatus 11 in the embodiment, even if the plurality of objective lenses 16 are provided, by changing the area or the like of the magnet as occasion demands in accordance with the provision and by adjusting an electromagnetic or mechanical force relationship, it is possible to match each driving center with the suspension center 20, to thereby eliminate or reduce both the pitching resonance and the yawing resonance.

Incidentally, if the plurality of objective lenses are provided, they may be arranged not in the x direction but in the y direction.

Moreover, if the magnetic force is adjusted when the position of each driving center is changed, various parameters of the magnet which is a magnetic force determining factor, e.g. magnetic permeability μ, magnetic flux density B, or area S, may be changed, or a ratio of electric currents to flow in the coils may be changed.

(4) Fourth Embodiment

Figure 10:
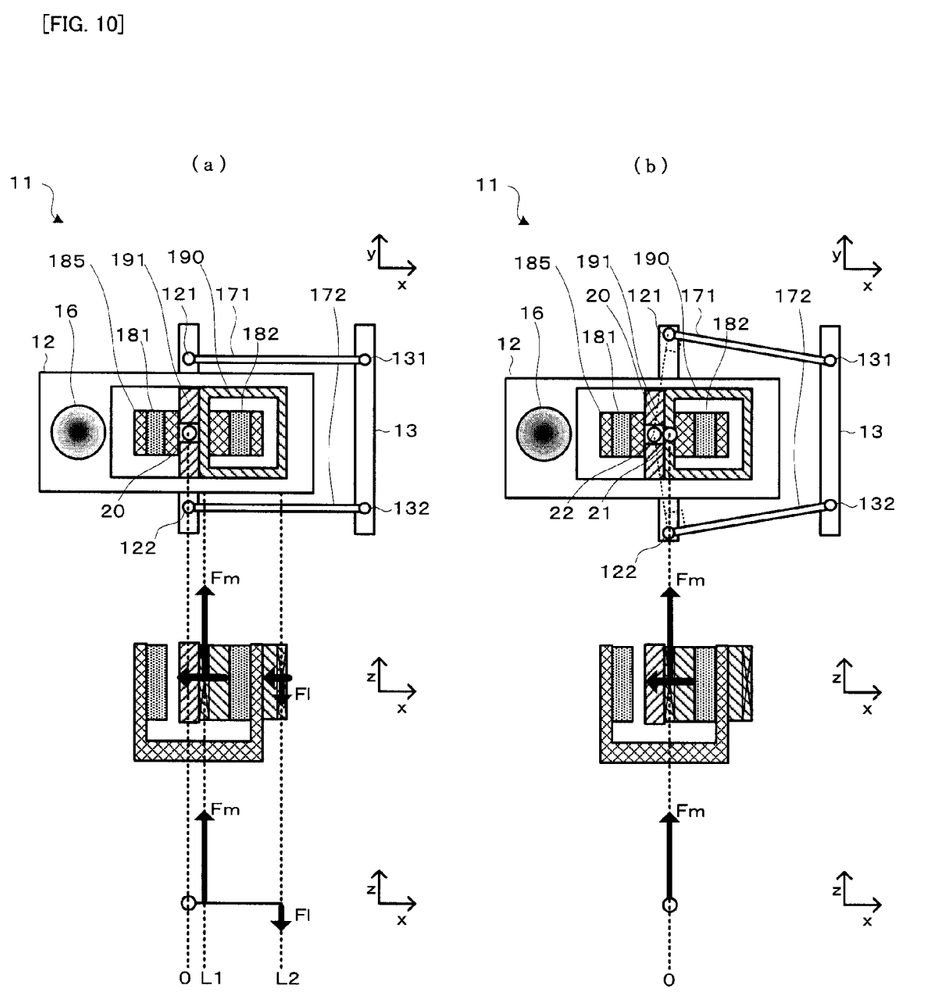
FIG. 10 are a plan view, a cross sectional view, and a moment diagram conceptually showing the basic structure of an objective lens driving apparatus associated with a Slim system in a fourth embodiment.

Next, with reference to FIG. 10 in addition to FIG. 2, an explanation will be given on the structure and operation process of an objective lens driving apparatus in a fourth embodiment. Incidentally, in FIG. 10, the same structure as that in the aforementioned drawings carries the same numerical reference, and the explanation thereof will be omitted as occasion demands. FIG. 10 are a plan view, a cross sectional view, and a moment diagram conceptually showing the basic structure of an objective lens driving apparatus associated with a Slim system in a fourth embodiment. More specifically, FIG. 10(a) shows a plan view (xy plane), a cross sectional view (xz plane), and a moment diagram (xz plane) of the objective lens driving apparatus 11 in a comparison example from the top, and FIG. 10(b) shows those in the embodiment.

In FIG. 10(a), the objective lens driving apparatus 11 in the comparison example is provided particularly with: a base 185; a focusing coil 190; and a tracking coil 191, which is a standard structure of the Slim system. The base 185 has e.g. "⊐" (or inversed C) letter shape and is firmly fixed such that the magnet 181 and the magnet 182 face each other. The focusing coil 190 is a coil for focusing, and is made of a wire rod, such as a copper wire, spirally winded. The tracking coil 191 is a coil for tracking, and is made of a wire rod, such as a copper wire, spirally winded.

Here, according to the structure in the comparison example, the suspension spring 171 and the suspension spring 172 are disposed to be substantially parallel to each other, and the suspension center 20 on the lens holder side of the both suspension springs is set to a midpoint of a line segment connecting the spring connection 121 and the spring connection 122. Then, it is constructed such that the driving center in the focusing direction, the driving center in the tracking direction, and the center of gravity of the lens holder assembly match the suspension center 20.

At this time, there is a shift in position between the suspension center 20 and a point L1 of application of a focusing excitation force Fm, in other words, the interval between a point O (a point of the center of gravity/tracking driving center) and a point L1 has a greater value than 0. Thus, if the force Fm acts on the point L1, a rotational moment of Fm×L1 is generated around the point O.

Then, in order to cancel the rotational moment, by providing a leakage magnetic flux for a point L2 so as to generate a thrust force F1 of Fm×L1=F1×L2 (F is a thrust force, and L is a distance from the point O), the rotational moment around the point O is balanced, and the focusing driving center can be matched with the point O. However, as described above, when the focusing driving center is adjusted, the thrust force in the focusing direction causes the force (thrust force F1) in the opposite direction to the thrust force, which results in a reduction in the thrust force in the focusing direction as a whole. Specifically, for example, there is a loss of about 20%.

In contrast, in FIG. 10(b), on the objective lens driving apparatus 11 in the embodiment, in particular, the suspension spring 171 and the suspension spring 172 are disposed not to be parallel to each other, in other words, to be in the "⋀" (or inversed V) letter shape in planar view (the open side can be the lens holder 12 side or the spring holder 13 side). Moreover, a tracking driving center 22 is set to the parallel line to the suspension spring (right) 171 drawn from the spring connection 121 and the suspension spring (left) 172 drawn from the spring connection 122. In addition, the focusing driving center and the center 21 of gravity of the lens holder assembly are set to the midpoint of the line segment connecting the spring connection 121 and the spring connection 122.

By virtue of such construction, the following merit can be received. That is, the arrangement in the "⋀"(or inversed V) letter shape of the springs can improve the inclination of the lens and can increase a rolling frequency, so that it is possible to avoid the synchronization of the resonance frequency and the rotation frequency of the spindle motor. In addition, L1=0 and the rotational moment around the point O is Fm×L=Fm×0=0; namely, it is constant regardless of Fm. Thus, there is no need to provide the leakage magnetic force to cancel the rotational moment. Therefore, the loss of the driving force is avoided, and the thrust force in driving is also improved. For example, there is an improvement of about 25%, compared to the comparison example.

Moreover, the tracking driving center 22 and the focusing driving center are preferably adjusted not to become the resonance source. Thus, it is also possible to eliminate or reduce both the pitching resonance and the yawing resonance.

As explained above with reference to FIG. 10, according to the objective lens driving apparatus 11 in the embodiment, even in the Slim system, it is possible to eliminate or reduce both the pitching resonance and the yawing resonance, while avoiding the loss of the thrust force as much as possible.

According to each embodiment described above, since the driving center is preferably adjusted, for example, the application of the driving force in the tracking direction does not cause or hardly cause the resonance. That is, compared to the objective lens driving apparatus designed in accordance with the designing theory, the resonance is reduced or eliminated. Therefore, the quality of servo control and the quality of reading/writing of a signal with respect to a disc-shaped recording medium are also improved, so that it is extremely useful in practice. In addition, there is no need to apply some prohibitive power to control the resonance, so that the loss of the driving force is also reduced or eliminated, and it is possible to drive the objective lens, extremely efficiently.

Incidentally, the present invention is not limited to the aforementioned embodiments, but various changes may be made, if desired, without departing from the essence or spirit of the invention which can be read from the claims and the entire specification. An objective lens driving apparatus, and an optical pickup or an information recording/reproducing apparatus, provided with the objective lens driving apparatus, all of which involve such changes, are also intended to be within the technical scope of the present invention.

INDUSTRIAL APPLICABILITY

The objective lens driving apparatus, the optical pickup, and the information recording/reproducing apparatus according to the present invention can be applied to an objective lens driving apparatus, an optical pickup, and an information recording/reproducing apparatus capable or eliminating or reducing a resonance possibly generated when recording or reproduction is performed on an optical disc, such as a CD (Compact Disc), DVD, BD (Blu-ray Disc), or HD (High Definition)-DVD.

The invention claimed is:

1. An objective lens driving apparatus comprising:
   an objective lens for focusing a laser beam on a disc-shaped recording medium;

a lens holder, which holds said objective lens and which is driven at least in a tracking direction of the disc-shaped recording medium ;

a pair of linear suspension springs for supporting said lens holder on one ends so as to sandwich said lens holder from both sides thereof, viewed in a planar manner from an optical axis direction of said objective lens;

a spring holder to which each of the other ends of said pair of linear suspension springs is fixed; and a driving device for at least tracking-driving said objective lens and said lens holder, said pair of linear suspension springs having a narrower or wider distance between the one ends than that between the other ends, viewed in the planar manner from the optical axis direction, wherein a driving center in tracking-driving said lens holder is positioned at an intersection of (i) a first linear segment passing said one end of one linear suspension spring of said pair of linear suspension springs and intersecting the one linear suspension spring at a right angle, with (ii) a second linear segment passing said one end of the other linear suspension spring of said pair of linear suspension springs and intersecting the other linear suspension spring at a right angle, viewed in the planar direction from the optical axis direction.

2. The objective lens driving apparatus according to claim 1, wherein said lens holder holds at least two objective lenses.

3. The objective lens driving apparatus according to claim 2, wherein the at least two objective lenses are arranged on a linear segment which is sandwiched between said pair of linear suspension springs and which passes the driving center in tracking-driving.

4. The objective lens driving apparatus according to claim 1, wherein said pair of linear suspension springs includes a plurality of linear suspension springs arranged in the optical axis direction in each of the both sides.

5. The objective lens driving apparatus according to claim 1, wherein said driving device focusing-drives said objective lens in addition to tracking-driving it.

6. The objective lens driving apparatus according to claim 5, wherein the driving center in tracking-driving is also a driving center in focusing-driving said objective lens.

7. The objective lens driving apparatus according to claim 5, wherein said lens holder is supported by said pair of linear suspension springs and is driven by said driving device so as to relatively reduce a pitching resonance and a yawing resonance, the pitching resonance being possibly generated in driving in the tracking direction, the yawing resonance being possibly generated in driving in the focusing direction.

8. The objective lens driving apparatus according to claim 1, wherein
said driving device has:
a tracking drive coil for driving said lens holder in the tracking direction;
a focusing drive coil for driving said lens holder in the focusing direction; and
magnets arranged with their different magnetic poles facing to each other.

9. The objective lens driving apparatus according to claim 8, wherein at least one of arrangement of each of the magnets, a ratio of areas of facing surfaces and a ratio of mass is adjusted such that the driving center in tracking-driving approaches the intersection.

10. The objective lens driving apparatus according to claim 9, wherein at least one of a ratio of electricity and a ratio of the number of winding between the tracking drive coil and the focusing drive coil is adjusted.

11. An optical pickup comprising:
the objective lens driving apparatus according to claim 1;
a laser beam source for irradiating the laser beam; and
an optical system for guiding the laser beam to the objective lens driving apparatus.

12. An information recording/reproducing apparatus comprising:
the optical pickup according to claim 11;
a signal recording/reproducing device for providing a signal related to recording or receiving a signal related to reproduction, with respect to the optical pickup, in order to perform the recording or the reproduction of the signal with respect to the disc-shaped recording medium; and
a rotating device for rotating the disc-shaped recording medium along with the recording or the reproduction.

* * * * *